No. 877,613.

PATENTED JAN. 28, 1908.

P. G. TACCHI.
DRIVING GEAR FOR MOTOR ROAD VEHICLES.
APPLICATION FILED NOV. 18, 1905.

3 SHEETS—SHEET 1.

Witnesses
Jno Smire
W. A. Williams

Inventor
Percy George Tacchi
By Stewart & Stewart
Attorneys.

No. 877,613. PATENTED JAN. 28, 1908.
P. G. TACCHI.
DRIVING GEAR FOR MOTOR ROAD VEHICLES.
APPLICATION FILED NOV. 18, 1905.

3 SHEETS—SHEET 2.

No. 877,613. PATENTED JAN. 28, 1908.
P. G. TACCHI.
DRIVING GEAR FOR MOTOR ROAD VEHICLES.
APPLICATION FILED NOV. 18, 1905.

3 SHEETS—SHEET 3.

Witnesses
Jno Murie
W. A. Williams

Inventor
Percy George Tacchi
By Stewart & Stewart
Attorneys

UNITED STATES PATENT OFFICE.

PERCY GEO. TACCHI, OF ACTON, LONDON, ENGLAND.

DRIVING-GEAR FOR MOTOR ROAD-VEHICLES.

No. 877,613.  Specification of Letters Patent.  Patented Jan. 28, 1908.

Application filed November 18, 1905. Serial No. 287,956.

*To all whom it may concern:*

Be it known that I, PERCY GEORGE TACCHI, a subject of the King of Great Britain, residing at 29 Nemoure road, Acton, London, England, have invented new and useful Improvements for Driving-Gear for Motor Road-Vehicles, of which the following is a specification.

This invention relates to an improved driving gear for motor road vehicles and it has for its objects to construct a cheap compact and efficient device for the purpose specified and also to provide means whereby the parts transmitting the power may be readily adjusted to compensate for wear.

In carrying the invention into effect I employ friction clutch cones one of which is secured to the engine shaft and the other is mounted independently upon the driving shaft for the vehicle. With either of the cones above referred to may be engaged a third double cone secured to the driving shaft.

Figure 1:
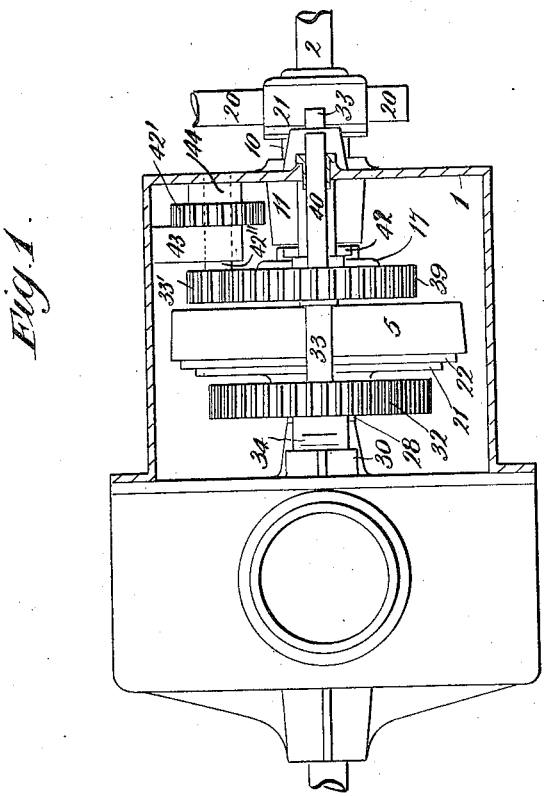
Figure 2:
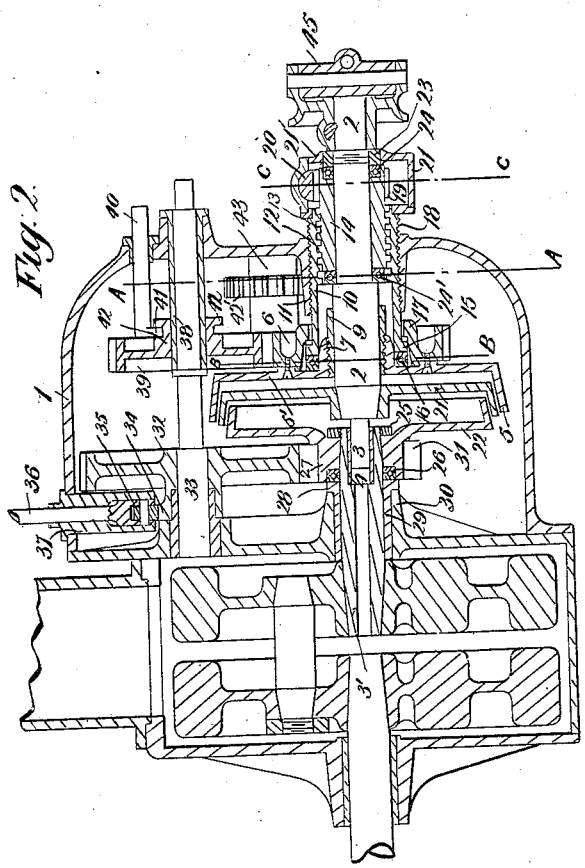
Figure 3:
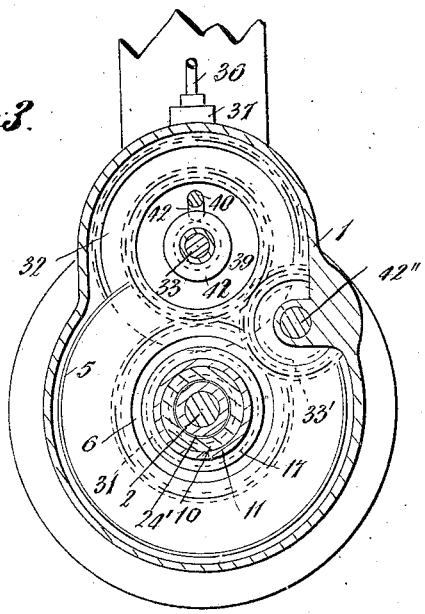
Figure 4:
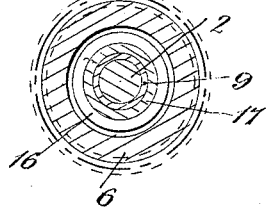
Figure 5:
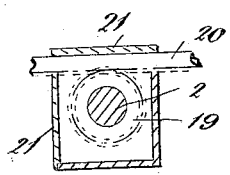

In order that the invention may be better understood drawings are appended in which Figure 1 is a plan of the improved gear the outer case being shown in section. Fig. 2 is a longitudinal vertical section thereof. Fig. 3 is a section on line A A Fig. 2. Fig. 4 is a section on line B B Fig. 2. Fig. 5 is a section on line C C Fig. 2.

Referring to the appended drawings 1 indicates the outer case or cover of the gear and 2 the driving shaft the inner end 3 of which is reduced in diameter, such reduced portion being supported in a recess formed in the end of the engine shaft $3^1$ and which recess is provided with a suitable bush 4. The length of the recess is somewhat greater than the length of the reduced end 3 of the driving shaft in order to permit of a certain amount of longitudinal movement of said shaft 2. Freely mounted upon the shaft 2 is a friction cone 5 to the body of which $5^1$ is secured a pinion 6. The cone 5 is provided at 7 with an internally screwed projection engaging a threaded sleeve 9 surrounding the shaft 2.

10 indicates a sleeve secured at one end to a hollow boss 11 formed upon the gear casing 1 and which sleeve is provided internally with a square screw thread 12 designed to engage a thread 13 formed upon the exterior of a sleeve 14 secured to the shaft 2 but capable of rotation independently of said shaft. The inner end of the sleeve 10 is provided with a collar 15 abutting upon one side against a ball bearing 16 interposed between said collar 15 and the body of the friction cone 5. A collar 17 is formed upon the hollow boss of pinion 6 and a bearing washer of steel or other hard metal is interposed between the inner face of collar 17 and the outer face of collar 15. A screw thread 18 is formed upon the exterior of the sleeve 10 in order that the said sleeve may be advanced to compensate for the wear of the surface of the friction cones to permit of which adjustment suitable apertures may be provided in the casing 1.

Secured to or formed integral with the sleeve 14 at the outer end thereof is a pinion 19 engaging a rack 20 supported by a casing $21^1$ secured in any suitable manner to the end of the said sleeve 10. The movement of the rod rotates the pinion 19 and according to the direction of motion of such pinion the sleeve 14 and with it the shaft 2 will be moved longitudinally bringing the friction cone 21 secured to the end of the shaft 2 into engagement with either of the friction cones 5 and 22 the latter cone being mounted upon the end of the engine shaft $3^1$.

23 indicates a collar secured to the outer end of the shaft 2 and which collar is designed to limit the outer movement of the sleeve 14, a ball bearing 24 being interposed between the end of the aforesaid sleeve 14 and the collar 23. $24^1$ indicates a ball bearing interposed between the inner end of sleeve 14 and the enlarged portion of shaft 3. The cone 22 as aforesaid is mounted upon the end of shaft $3^1$ and is secured against longitudinal displacement by means of the nut 25 at the end of the said shaft $3^1$ and the ball bearing 26 abutting the opposite end of the boss 27 of cone 22 and for which a recess is formed in said boss. The bearing 26 abuts a collar 28 upon the end of bush 29 contained within the boss 30 formed upon the engine casing. Secured in any suitable manner to the boss of cone 22 is a pinion 31 engaging a pinion 32 mounted upon the counter shaft 33 the ends of which are supported within bearings formed upon the casing 1 and the engine casing. The boss of pinion 32 is extended and has formed upon it a cam surface 34 engaging a roller 35 upon the end of a valve rod 36 moving in a guide 37. Mounted upon a sleeve 38 upon counter shaft 33 and free to move longitudinally thereon is a pinion 39 the movement of the pinion being effected by means of a rod 40 provided at one end with a projection 41 engaging a groove 42, formed upon the boss of the pinion 39. The pinion is feathered or otherwise connected to the sleeve and normally engages the pinion 6 as shown by the drawings. When however it is desired to reverse the direction of rotation and the gear the pinion is moved along the sleeve by means of rod 40, actuated through a suitable system of levers, and is engaged with a pinion $42^1$ secured to the shaft $42^{11}$. The shaft $42^{11}$ is operated by means of the pinion $33^1$ secured thereto and in gear with the pinion 6 secured to cone 5. Bearings 43, 44 are provided for shaft $42^{11}$. A suitable gimbal or other connection 45 is provided upon the end of shaft 2 for the attachment of a shaft operating the driving wheels.

The action of gear is as follows:—The movement of the operating rack being effected by means of suitable levers operated either by hand or foot causes the screwed sleeve 14 to be rotated pushing the shaft 2 to the right or left of the position shown in Fig. 1. The movement in these directions will cause one cone 21 to engage respectively the cone 5 or cone 22 the outer periphery of cone 21 engaging the inner periphery of cone 5 and the inner periphery of said cone 21 engaging the outer periphery of cone 22 according as shaft 3 is moved to its left or right hand terminal position. The cone 22 being secured to the engine shaft $3^1$ it follows that when the cone 5 is engaged therewith the engine shaft and the driving shaft rotate at the same speed. Upon the other hand when the cone 21 is engaging cone 5 the speed of the driving shaft will be greater or less than that of the engine shaft according to the proportions of the respective pinions 31, 32 and 6, 39, it being understood that these may be secured as desired. The cone 21 may moreover be caused to occupy a position intermediate of cones 5 and 22 in which case it is evident that no movement will be transmitted from the engine shaft, the vehicle then remaining stationary. To reverse the direction of the motion the pinion 39 is engaged with pinion $42^1$ in the manner previously described. By means of the present construction the employment of catches or equivalent devices for securing the lever operating the clutches may be dispensed with and the change of speed or reversal of the direction of motion readily and easily effected.

It will be understood that I do not desire to limit myself to the precise form and arrangement shown and described as I may vary same as may be found in practice to be necessary or desirable. For example I may employ more than one pinion which may be secured to the larger clutch basin, further pinions being employed upon the counter shaft which may be arranged to be thrown into gear with the aforesaid pinions connected to the clutch basin. By this means 3 or more speeds are possible the principle of the invention remaining the same. A further novel feature of the invention lies in the fact that the two diameters of the clutch basin are utilized.

What I claim as my invention and desire to secure by Letters Patent is:

1. The combination with a casing, of an internally threaded sleeve carried by said casing, a driven shaft passing through said sleeve, an externally threaded sleeve mounted on said shaft with its threads in engagement with said internally threaded sleeve, a rack and pinion adapted to rotate said internally threaded sleeve on its shaft to move the same longitudinally, a clutch cone adapted to rotate the said internally threaded sleeve, means for preventing longitudinal movement of said clutch cone or said last mentioned sleeve and a driving shaft provided with a second clutch cone with which said first mentioned clutch cone may be engaged by the longitudinal movement of the sleeve.

2. The combination with a casing, of an internally threaded sleeve carried by said casing, a driven shaft passing through said sleeve, an externally threaded sleeve mounted on said shaft with its threads in engagement with said internally threaded sleeve, a rack and pinion adapted to rotate said internally threaded sleeve on its shaft to move the same longitudinally, a clutch cone adapted to rotate the said externally threaded sleeve, ball bearings for preventing longitudinal movement of said clutch cone or said last mentioned sleeve and a driving shaft provided with a second clutch cone with which said first mentioned clutch cone may be engaged by the longitudinal movement of the sleeve.

3. In a driving gear for a motor road vehicle the combination with two driven shafts mounted in axial alinement of each other, of a pair of clutch cones mounted upon the adjacent ends of said shafts and means for moving one of the said shafts longitudinally to cause the engagement and disengagement of its clutch cones, said means comprising an externally screw threaded sleeve secured to said shaft so as to be capable of independent rotary motion, a second sleeve internally screw threaded and adapted to engage the threads of the internally threaded sleeve, a pinion upon the first sleeve and a rack engaging said pinion whereby the rotation of said pinion will rotate the first sleeve and through the screw threaded connection move the same and the shaft longitudinally.

In testimony whereof I have signed my name to this specification in the presence of two subscribing witnesses.

PERCY GEO. TACCHI.

Witnesses:
F. M. HEATHCOTE,
OWEN PERCY.